US007069379B2

(12) United States Patent
Inagaki

(10) Patent No.: US 7,069,379 B2
(45) Date of Patent: Jun. 27, 2006

(54) MULTISTAGE INFORMATION RECORDING METHOD AND SYSTEM USING MAGNETIC RECORDING DISK UNITS

(75) Inventor: Takeshi Inagaki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 10/388,676

(22) Filed: Mar. 14, 2003

(65) Prior Publication Data
US 2003/0221065 A1 Nov. 27, 2003

(30) Foreign Application Priority Data
Mar. 15, 2002 (JP) ............................. 2002-071742

(51) Int. Cl.
G06F 12/00 (2006.01)
(52) U.S. Cl. ....................... 711/112; 711/162; 707/204; 369/47.33
(58) Field of Classification Search ........ 711/111–114, 711/161–162, 170–173; 707/202–205; 714/1–7; 360/53; 369/47.33
See application file for complete search history.

(56) References Cited

U.S. PATENT DOCUMENTS

| 5,126,889 | A  | * | 6/1992  | Walden ........................ 360/53 |
| 5,550,998 | A  | * | 8/1996  | Willis et al. ................. 711/114 |
| 6,035,412 | A  | * | 3/2000  | Tamer et al. .................... 714/6 |
| 6,397,292 | B1 | * | 5/2002  | Venkatesh et al. .......... 711/114 |
| 6,532,517 | B1 | * | 3/2003  | Wagner et al. .............. 711/112 |
| 6,608,460 | B1 | * | 8/2003  | Okada ........................ 318/567 |
| 6,622,206 | B1 | * | 9/2003  | Kanamaru et al. .......... 711/113 |
| 6,766,414 | B1 | * | 7/2004  | Francis et al. .............. 711/113 |
| 6,795,385 | B1 | * | 9/2004  | Nishimura et al. ....... 369/47.33 |
| 6,813,688 | B1 | * | 11/2004 | Wu et al. .................... 711/114 |

FOREIGN PATENT DOCUMENTS

| JP | 02-284246 | 11/1990 |
| JP | 03-259319 | 11/1991 |
| JP | 03-260852 | 11/1991 |
| JP | 04-005740 | 1/1992  |
| JP | 04-111113 | 4/1992  |
| JP | 05-019975 | 1/1993  |
| JP | 05-120844 | 5/1993  |
| JP | 05-189316 | 7/1993  |

(Continued)

OTHER PUBLICATIONS

Japan Patent Office, Office Action for Japanese Patent App. No. 2002-071742, Jul. 12, 2005, 5 pages.

*Primary Examiner*—Nasser Moazzami
(74) *Attorney, Agent, or Firm*—Timothy N. Ellis

(57) ABSTRACT

At least two magnetic disk units are used as a primary storage unit and a secondary storage unit, and, when an information write request is received, received information is sequentially written into consecutive recording areas in the same recording track of the primary storage unit disregarding write control information included in the received information, and if all recording areas in one track have been exhausted, the writing is continued to recording areas in a recording track adjacent to the one track at the inside or outside thereof, and the received information including the control information is read from the primary storage unit and written into the secondary storage unit based on the control information when the primary storage unit does not perform processing in response to a write or read request.

18 Claims, 12 Drawing Sheets

FOREIGN PATENT DOCUMENTS

| | | |
|---|---|---|
| JP | 05-274090 | 10/1993 |
| JP | 07-271647 | 10/1995 |
| JP | 07-334426 | 12/1995 |
| JP | 09-212424 | 8/1997 |
| JP | 10-293717 | 11/1998 |
| JP | 11-249817 | 9/1999 |
| JP | 2000-357060 | 12/2000 |
| JP | 2001-014110 | 1/2001 |
| JP | 2001-036841 | 2/2001 |
| JP | 2001-100926 | 4/2001 |
| JP | 2001-143439 | 5/2001 |
| JP | 2001-283563 | 10/2001 |

\* cited by examiner

US 7,069,379 B2

MULTISTAGE INFORMATION RECORDING METHOD AND SYSTEM USING MAGNETIC RECORDING DISK UNITS

BACKGROUND

1. Field of the Invention

This invention relates to an information recording system using magnetic recording disk units. More particularly, the invention relates to an information recording system which uses a plurality of magnetic recording disk units as multistage storage units.

2. Background Art

Many information recording systems have heretofore been known which employ a plurality of magnetic recording disk units (hereinafter referred to as disk units) such as hard disk drives, like the ones for expanding storage capacity by using a plurality of disk units, or the ones for duplicating information having the same contents by storing them in two different disk units.

FIG. 11 is a block diagram schematically illustrating the constitution of an information recording system by using a conventional disk unit.

An information recording system 1 is connected to a user unit 2, and a control unit 11 writes record information into a disk unit 21 in a storage unit 12 in response to a write request WR received, or reads the record information from the disk unit 21 in response to a read request RD received.

When, for example, the record information is to be written into the disk unit 21, the control unit 11 refers to write control information included in the received information such as the write request WR, and the record information is written into the disk unit 21 according to a form desired by a source of the write request (user unit 2). Further, when the record information is to be read from the disk unit 21, the control unit 11 refers to read control information included in the received information such as the read request RD, and the record information desired by a source of the read request (user unit 2) is read from the disk unit 21 in the storage unit 12 and sent to the source of the read request.

A disk unit, in general, reads and writes information at slower speed than a semiconductor memory. Therefore, a modern disk unit is provided with a semiconductor cache memory at an input/output interface thereof, and holds record information in the cache memory up to an optimum timing, enabling the disk unit to be continuously used for writing or reading the information as much as possible or enabling the information to be read or written at high speed by decreasing a wait time on the side of the disk unit.

There has also been known a system utilizing a plurality of disk units called RAID (redundant array of inexpensive disks or redundant array of independent disks). The RAID has two objects. One object is to decrease loss of record information in case the disk unit has failed by redundantly recording the information in a manner of being dispersed in a plurality of disk units. Another object is to increase the access speed by recording the record information in a dispersed manner. The access speed in this case includes both meanings of increasing the number of bytes that are read or written in a unit time and shortening the response speed.

When, for example, the RAID uses N disk units, the record information is, first, divided into N, the divided record information is recorded into the first to N-th disk units at one time in a divided manner to shorten the recording time. In this case, the N disk units are all so treated as to possess the same function, and recording is effected in rotation by matching the time series of the record information with the order of the first to N-th disk units. By using the RAID, therefore, the access speed can, in principle, be increased to N times as fast.

When the disk unit is used for extended periods of time, in general, the access speed for writing and reading becomes slower than that of when the disk unit is first used. This is because when used for extended periods of time, available recording areas in the disk unit becomes scattered, and an extra seeking time is required for moving a magnetic recording/reproducing head.

FIG. 12 is a diagram illustrating discontiguous recording areas of a disk.

The disk unit 21 that rotates in the direction of an arrow B has a plurality of recording tracks formed in concentric, the tracks being denoted by TR0, TR1, TR2, TR3, - - -, TR7 successively from the outer peripheral side toward the inner peripheral side. The track TR0 of the outermost periphery is a region used by, for example, an operating system (OS) for managing the record information such as files or the like. The next track TR1 is a region which, in the case of, for example, MS-DOS® (or WINDOWS®), is used by a list (file allocation table: FAT) for making the record information such as files or directories corresponding with physical arrangements (e.g., sectors) in the disk. The track TR2 is a region which, in the case of, for example, MS-DOS® (or WINDOWS®), is used by a directory that indicates a file name, attribute, latest date of updating, file size and hierarchical structure. Therefore, the tracks TR0 to TR2 are used for management of the record information. Further, when the OS is not MS-DOS® but is, for example, LINUX of a UNIX® family, a file system called i-node system is used. In this case, some tracks are also similarly used for the management.

The tracks TR3 up to TR7 are data areas, and record information such as files are written therein. A recording area in each track is divided into the smallest physical access units called sectors. Several sectors constitute a cluster (CL), and one file is formed by one or a plurality of clusters (CLs).

A file can be continuously written in the consecutive clusters in, for example, track TR3 at the initial stage of use of the disk unit 21, but is, however, in FIG. 12, written in a cluster CL1 in the track TR3, in a cluster CL2 in the track TR5, in a cluster CL3 in the track TR4, and in a cluster CL4 in the track TR6. Thus, when clusters of a file are discretely written on the disk unit 21, an extra seeking time is needed for moving the magnetic recording/reproducing head as compared with the time when the clusters are continuously written on the same track.

The problem of extra seeking time that is required as the disk unit is used for an extended period of time cannot be solved by the use of the above semiconductor cache memory or by the system which handles plural disk units such as RAID.

SUMMARY

This invention was accomplished in order to solve the above problems, and has an object of providing an information recording method which does not require an extra seeking time even after the disk units are used for extended periods of time, and an information recording system therefor.

In order to accomplish the above object, the invention provides a multistage information recording method using a plurality of magnetic recording disk units, wherein at least two magnetic disk units are used as primary and secondary storage units, which is characterized in that, in response to an information write request, received information is sequentially written into consecutive recording areas in the same recording track of the primary storage unit disregarding write control information included in the received information, and if all recording areas in one track have been exhausted, the writing is continued to recording areas in a recording track adjacent to the one track at the inside or outside thereof, and the received information including the control information is read from the primary storage unit and written into the secondary storage unit based on the control information when the primary storage unit does not perform processing responsive to a write or read request.

The invention further provides a multistage information recording method using a plurality of magnetic recording disk units described above, wherein, when an information write request is received, the information received this time is written into the primary storage unit starting from a recording area that follows the end of the write information stored in the primary storage unit the last time.

The invention further provides a multistage information recording method using a plurality of magnetic recording disk units described above, wherein, when writing of the received information into the primary storage unit is finished, the end of the information stored in the primary storage unit this time is employed as the end of the write information in the primary storage unit.

The invention further provides a multistage information recording method using a plurality of magnetic recording disk units described above, wherein, when writing of the received information into the primary storage unit is finished, end of writing is notified to a source of the write request.

The invention further provides a multistage information recording method using a plurality of magnetic recording disk units described above, wherein, when the information write request is received, the information is written into the secondary storage unit if the residual capacity of the primary storage unit is smaller than the write information size and the primary storage unit has no portion overlapping the write information, or the overlapping portion is overwritten if it exists.

The invention further provides a multistage information recording method using a plurality of magnetic recording disk units described above, wherein, when an information read request is received, requested information is read from the primary storage unit disregarding read control information included in the received information if the requested information has been written in the primary storage unit, or the requested information is read from the secondary storage unit if the requested information has not been written in the primary storage unit.

The invention further provides a multistage information recording method using a plurality of magnetic recording disk units described above, wherein, when the information is to be read from the secondary storage unit and when a prefetch function is provided, the requested information is read out, and the prefetched information is transmitted to the primary storage unit and written therein.

The invention further provides a multistage information recording method using a plurality of magnetic recording disk units described above, wherein, when the information to be read out in response to the information read request is the prefetched information written into the primary storage unit, the information is read from the primary storage unit.

The invention further provides a multistage information recording method using a plurality of magnetic recording disk units described above, wherein an allocation information storage unit is provided for storing allocation information for each storage area in the primary storage unit, and when an information write request is received or when an information read request is received, write processing or read processing is executed by referring to the allocation information storage unit.

The invention further provides a multistage information recording method using a plurality of magnetic recording disk units described above, wherein, when the information write request is received, position information of the end of the write information stored in the primary storage unit the last time is detected from the allocation information storage unit, and the information received this time is written starting from a recording area that follows the end of the write information stored in the primary storage unit the last time.

The invention further provides a multistage information recording method using a plurality of magnetic recording disk units described above, wherein, when writing of the received information into the primary storage unit is finished, the end of the information stored in the primary storage unit this time is employed in the allocation information storage unit as the position information of the end of the write information in the primary storage unit.

The invention further provides a multistage information recording method using a plurality of magnetic recording disk units described above, wherein, when writing of the received information into the primary storage unit is finished, end of writing is notified to a source of the write request.

The invention further provides a multistage information recording method using a plurality of magnetic recording disk units described above, wherein, when the information write request is received, the allocation information for the information stored in the primary storage unit is detected from the allocation information storage unit, and the information is written into the secondary storage unit if the residual capacity of said primary storage unit is smaller than the write information size and the primary storage unit has no portion overlapping the write information, or the overlapping portion is overwritten if it exists.

The invention further provides a multistage information recording method using a plurality of magnetic recording disk units described above, wherein, when an information read request is received, the allocation information for requested information to be read out is detected from the allocation information storage unit, and the requested information is read from the primary storage unit if the requested information has been written in the primary storage unit, or the requested information is read from the secondary storage unit if the requested information has not been written in the primary storage unit.

The invention further provides a multistage information recording method using a plurality of magnetic recording disk units described above, wherein, when the information is to be read from the secondary storage unit and when a prefetch function is provided, the allocation information for the requested information to be read out is detected from the allocation information storage unit, the requested information is read out, and the prefetched information is transmitted to the primary storage unit and written therein.

The invention further provides a multistage information recording method using a plurality of magnetic recording disk units described above, wherein, the allocation information for the requested information to be read out is detected from the allocation information storage unit, and the requested information is read from the primary storage unit when the information to be read out in response to the information read request is the prefetched information written in the primary storage unit.

The invention provides a multistage information recording system using a plurality of magnetic recording disk units, which is characterized in that at least two magnetic disk units are used as primary and secondary storage units, the system is provided with a control unit which implements any one of the above-mentioned first to eighth multistage information recording methods using the magnetic recording disk units.

The invention further provides a multistage information recording system using a plurality of magnetic recording disk units, which is characterized in that at least two magnetic disk units are used as primary and secondary storage units, the system includes an allocation information storage unit which stores allocation information for each storage area of the primary storage unit, and the system is provided with a control unit which implements any one of the above-mentioned ninth to sixteenth multistage information recording methods using the magnetic recording disk units.

The invention further provides a multistage information recording system using a plurality of magnetic recording disk units described above, wherein the allocation information storage unit is constituted of nonvolatile semiconductor elements.

The invention further provides a multistage information recording system using a plurality of magnetic recording disk units described above, wherein the secondary storage unit is constituted of a plurality of magnetic recording disk units, and the control unit uses the magnetic recording disk units of the secondary storage unit in rotation.

The invention further provides a multistage information recording system using a plurality of magnetic recording disk units described above, wherein the primary storage unit is constituted of a plurality of magnetic recording disk units, and the control unit uses the magnetic recording disk units of the primary storage unit in rotation.

The invention further provides a multistage information recording system using a plurality of magnetic recording disk units described above, wherein if power source voltage of the multistage information system has suddenly been dropped or interrupted, and then restored under the conditions where storage blocks of a fixed size are arranged in the primary storage unit, header information recorded in each storage block includes information necessary for storing the write information in the secondary storage unit, and the allocation information storage unit is constituted of volatile semiconductor elements, then, the control unit restores at least part of the contents stored in the allocation information storage unit by using the header information read from each storage block of the primary storage unit when the power source is restored.

PREFERRED EMBODIMENTS OF THE INVENTION

The invention will now be described by way of diagramed embodiments.

Figure 1:
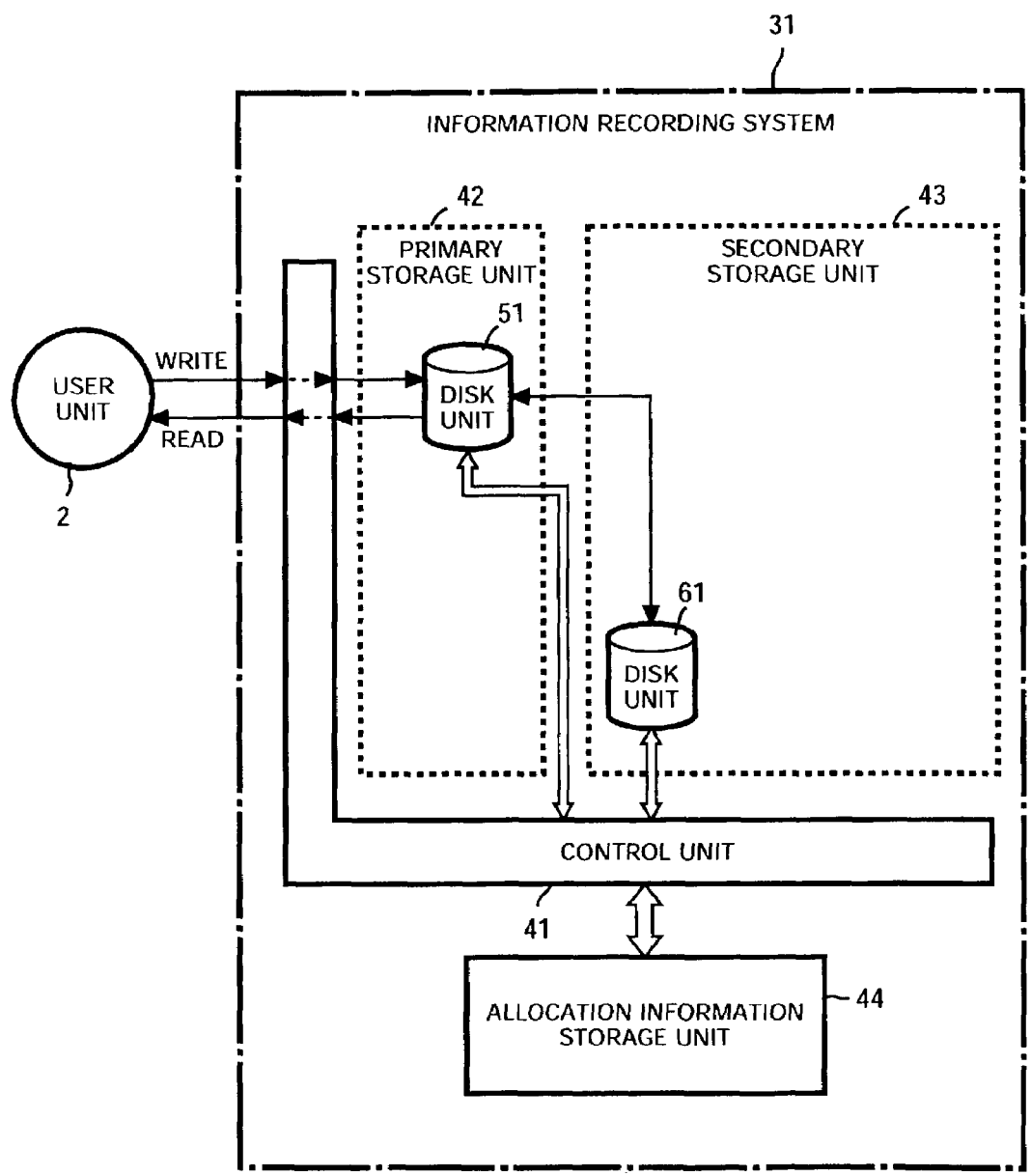
FIG. 1 is a block diagram illustrating the constitution of a multistage information recording system according to a first embodiment of the invention.

FIG. 1 is a block diagram illustrating the constitution of a multistage information recording system according to a first embodiment of the invention.

Figure 11:
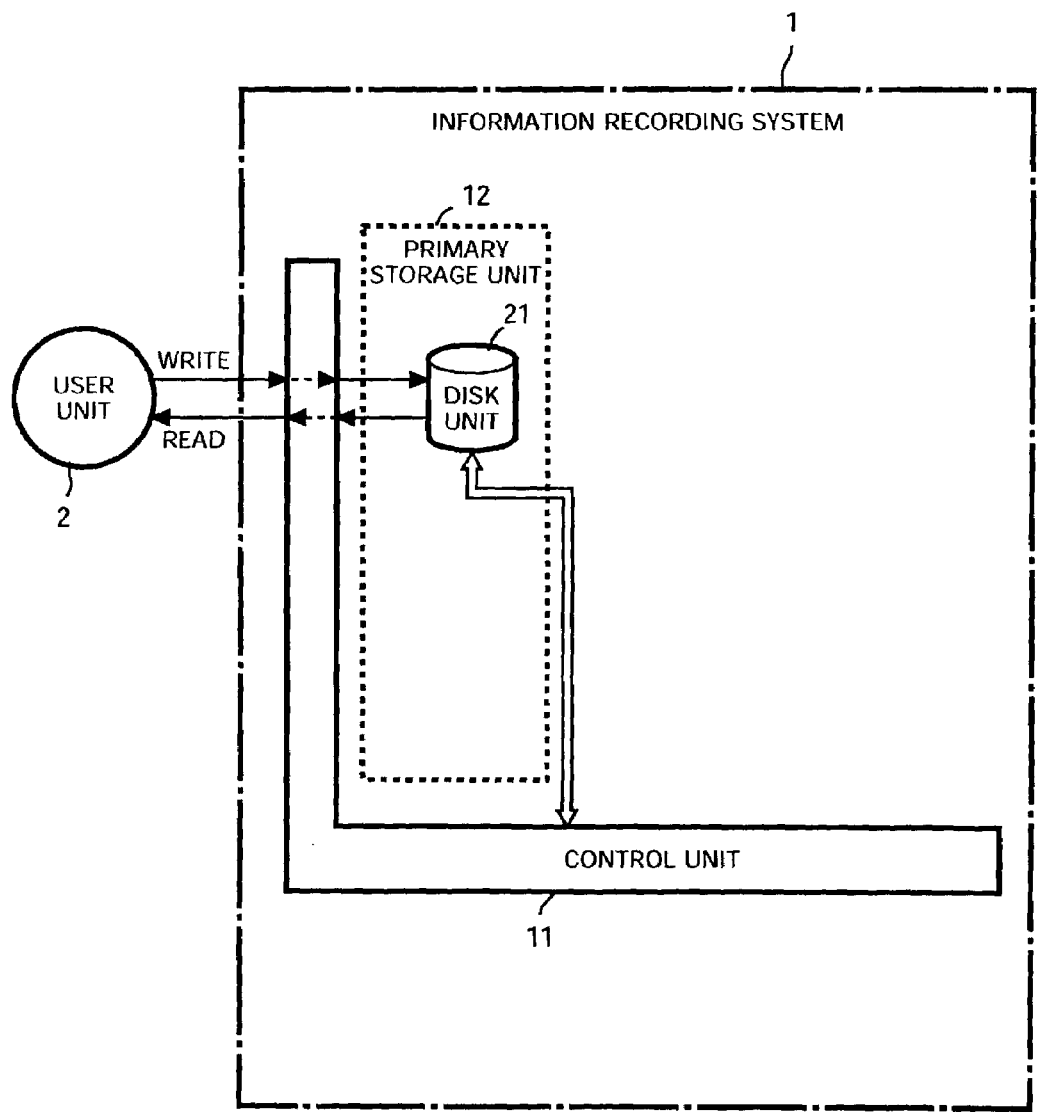
FIG. 11 is a block diagram schematically illustrating the constitution of an information recording system using a conventional disk unit.

In FIG. 1, the same functional portions as those of the conventional information recording system of FIG. 11 are denoted by the same reference numerals and their description is not repeated.

The main points that make the information recording system 31 of the embodiment shown in FIG. 1 different from the conventional information recording system 1 shown in FIG. 11, are that the conventional single stage storage is replaced by two stage storage including a primary storage unit 42 equipped with a disk unit 51 and a secondary storage unit 43 equipped with a disk unit 61, that provision is made of an allocation information storage unit 44 for storing allocation information for each storage area in the primary storage unit 42, and that the content of control by the control unit 41 is changed according to the above points of change. Though the details will be described later, allocation positions stored in the allocation information storage unit 44 include the allocation information in the primary storage unit 42 and the original allocation positions in the secondary storage unit 43.

The constitution in other respects is the same as the conventional constitution shown in FIG. 11, wherein the information recording system 31 is connected to a user unit 2, the record information is written into the disk unit 51 in the primary storage unit 42 upon receipt of a write request WR by the control unit 41, and the record information is read from the disk unit 51 upon receipt of a read request RD.

The user unit 2 is the one on the side that sends a write request or a read request to the information recording system 31, and may be a central arithmetic element in an information processor or a network device connected through a communication line. Therefore, the information recording system 31 and the user unit 2 may be connected together by such means as internal wiring like an internal bus, a connection cable that connects to an external unit, or a communication line.

Further, due to the provision of the primary storage unit 42 and the secondary storage unit 43 in two stages, at least two magnetic disk units are used as demonstrated by magnetic disk units 51 and 61 in FIG. 1. Further, the allocation information storage unit 44 is constituted of a nonvolatile semiconductor element such as flush ROM so that the stored contents will not be erased even in case power supply is interrupted due to an accident or the like.

The method based on the two stage configuration of the primary storage unit 42 and the secondary storage unit 43 is different from that of the system such as of the conventional RAID that similarly uses a plurality of disk units as described above, and is particularly different in regard to using the disk unit 51 in the primary storage unit 42.

Described below is how to use the disk unit 51 in the primary storage unit 42.

Figure 2:
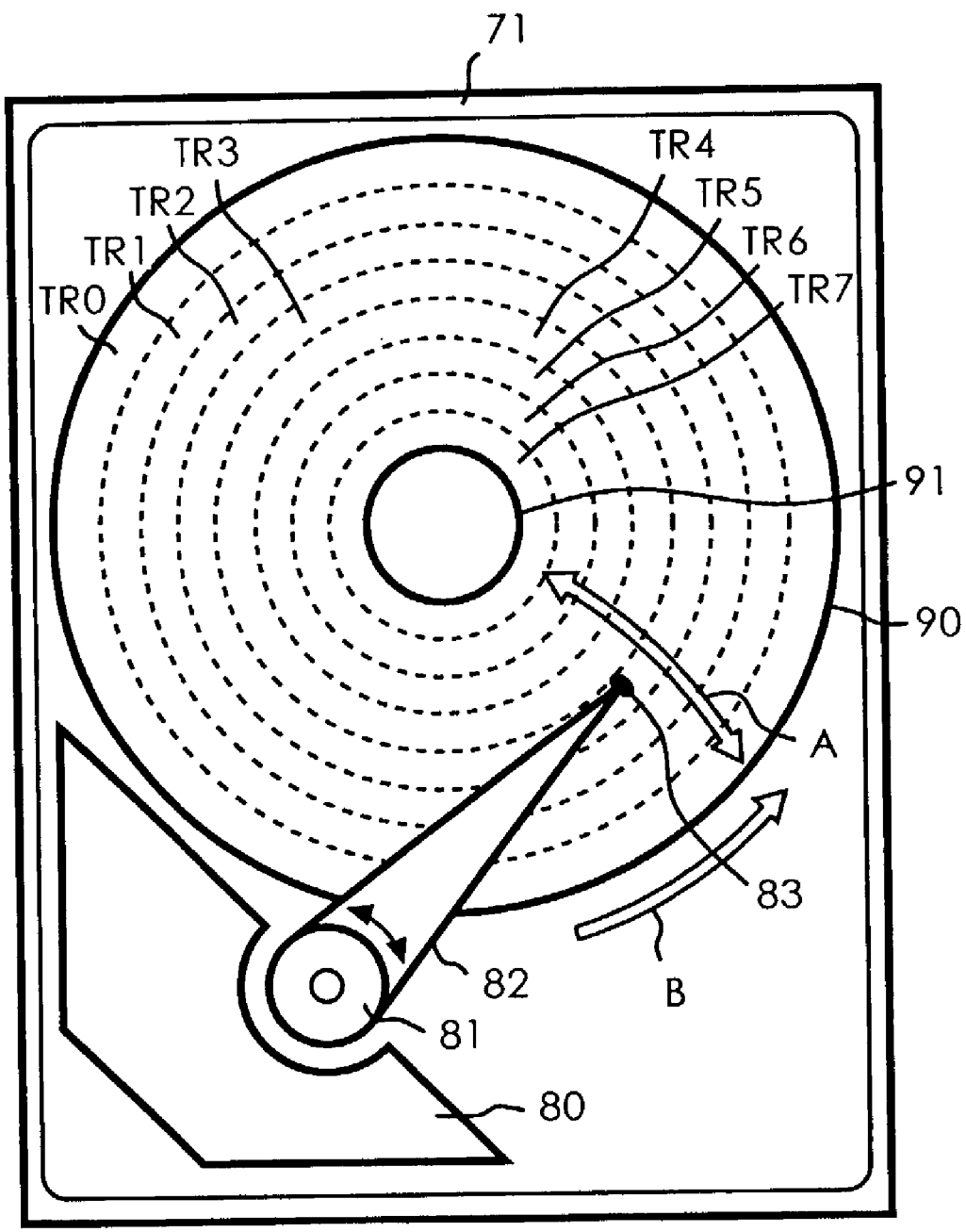
FIG. 2 is a diagram schematically illustrating the constitution of a disk and head mechanism in a hard disk unit.

FIG. 2 is a diagram schematically illustrating the constitution of a disk and head mechanism in a hard disk unit.

In a hard disk unit 70 of FIG. 2, reference numeral 71 denotes a housing that covers the outer periphery to protect the internal parts. Reference numeral 80 denotes an actuator for driving an arm 82 (described later) that moves a magnetic head 83 (described later). Reference numeral 81 denotes a shaft for rotating the arm 82 which holds the magnetic head 83 to move it. Reference numeral 83 denotes a magnetic recording/reproducing head (hereinafter referred to as magnetic head) for writing and reading record information (data, etc.) onto and from the magnetic recording disk which is a recording medium. As the actuator 80 drives the arm 82, the magnetic head 83 moves in a direction of an arrow A.

Figure 12:
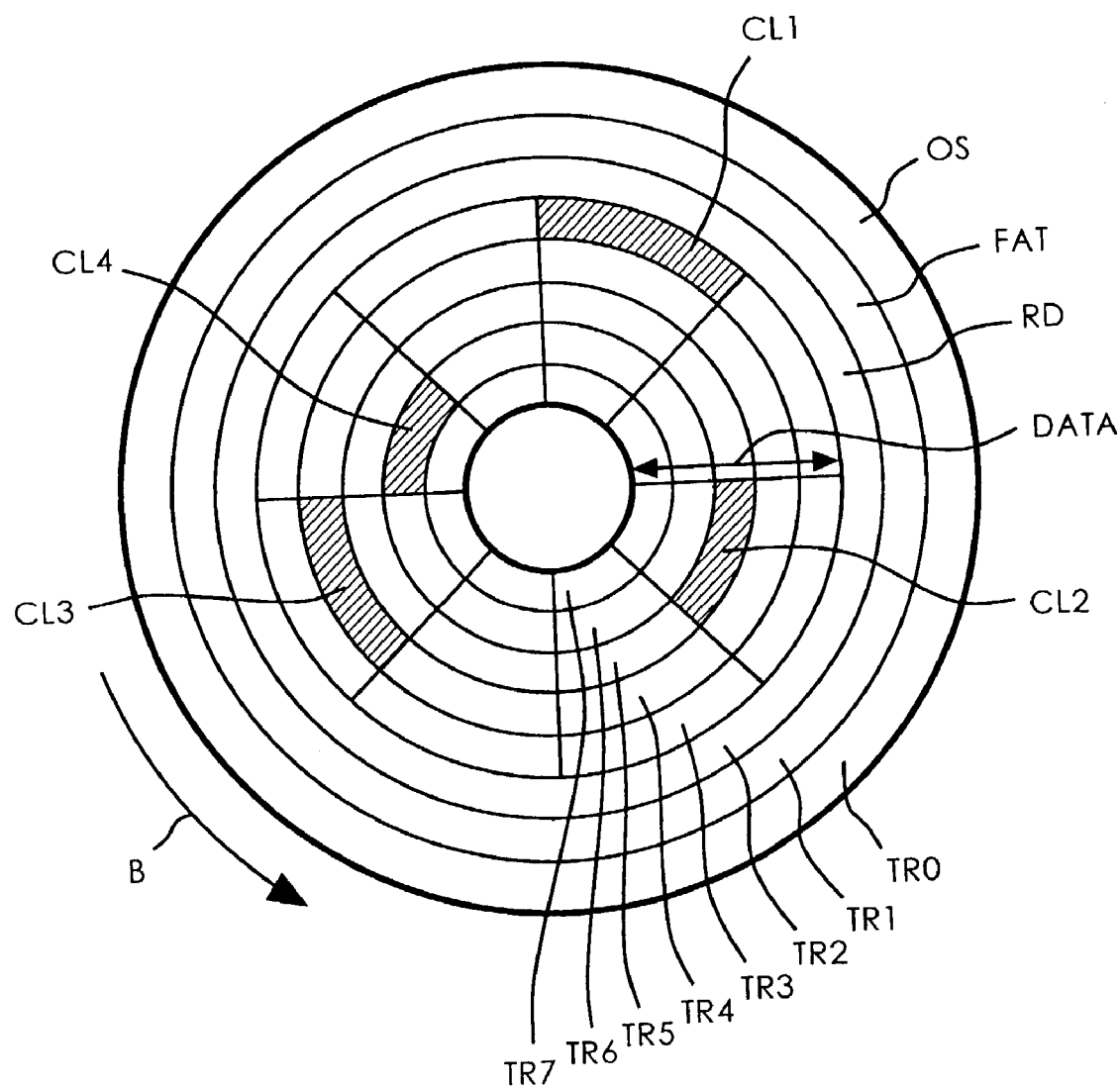
FIG. 12 is a diagram illustrating an example of discrete recording areas on the disk.

Reference numeral 90 denotes a magnetic recording disk (hereinafter referred to as disk) that serves as a recording medium to record the information while rotating in a direction of an arrow B, and 91 denotes a spindle of the disk 90. Referring to FIG. 12, the disk 90 is provided with a plurality of recording tracks TR0 to RT7 in concentric from the outer peripheral side toward the inner peripheral side.

In writing or reading information by using the hard disk unit, in general, what consumes the longest time is the so-called seeking time that is required in seeking a portion where the desired information is recorded by moving the magnetic head 83 in the direction of the arrow A. When it is attempted to increase access speed of the hard disk unit, the most important problem is how to shorten the seeking time.

Figure 3:
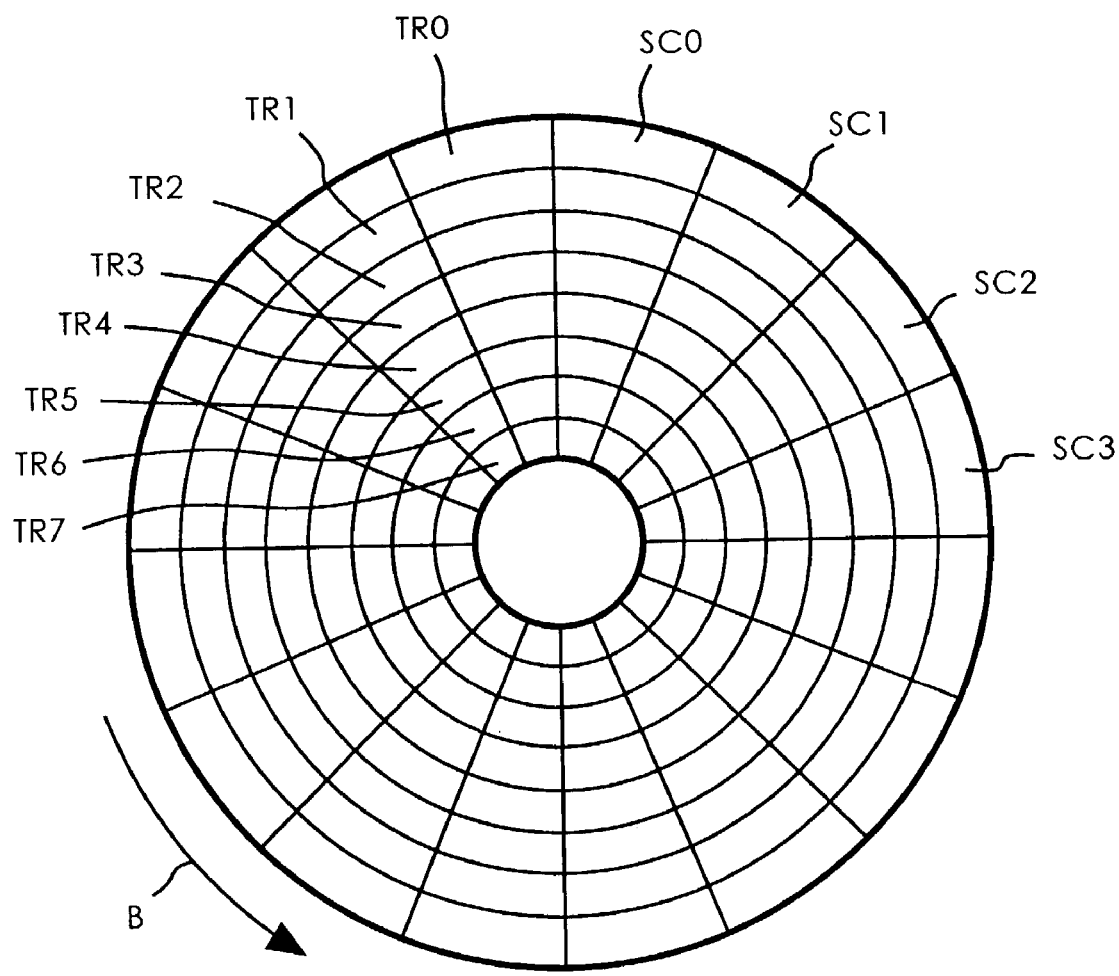
FIG. 3 is a diagram illustrating the recording surface of a magnetic recording disk in the disk unit.

FIG. 3 is a diagram illustrating a recording surface of the magnetic recording disk in the disk unit.

As shown in FIGS. 2 and 12, the disk 90 that rotates in the direction of the arrow B is provided with a plurality of recording tracks TR0 to TR7 concentric from the outer peripheral side toward the inner peripheral side, and sectors which are the smallest physical access units on the track TR0 on the outermost circumference, denoted by SC0, SC1, SC2, SC3, - - - clockwise from the uppermost portion in FIG. 2. A cluster (CL) is formed by several sectors, and a file is formed by one or a plurality of clusters (CLs), which are not illustrated in FIG. 3.

Figure 4:
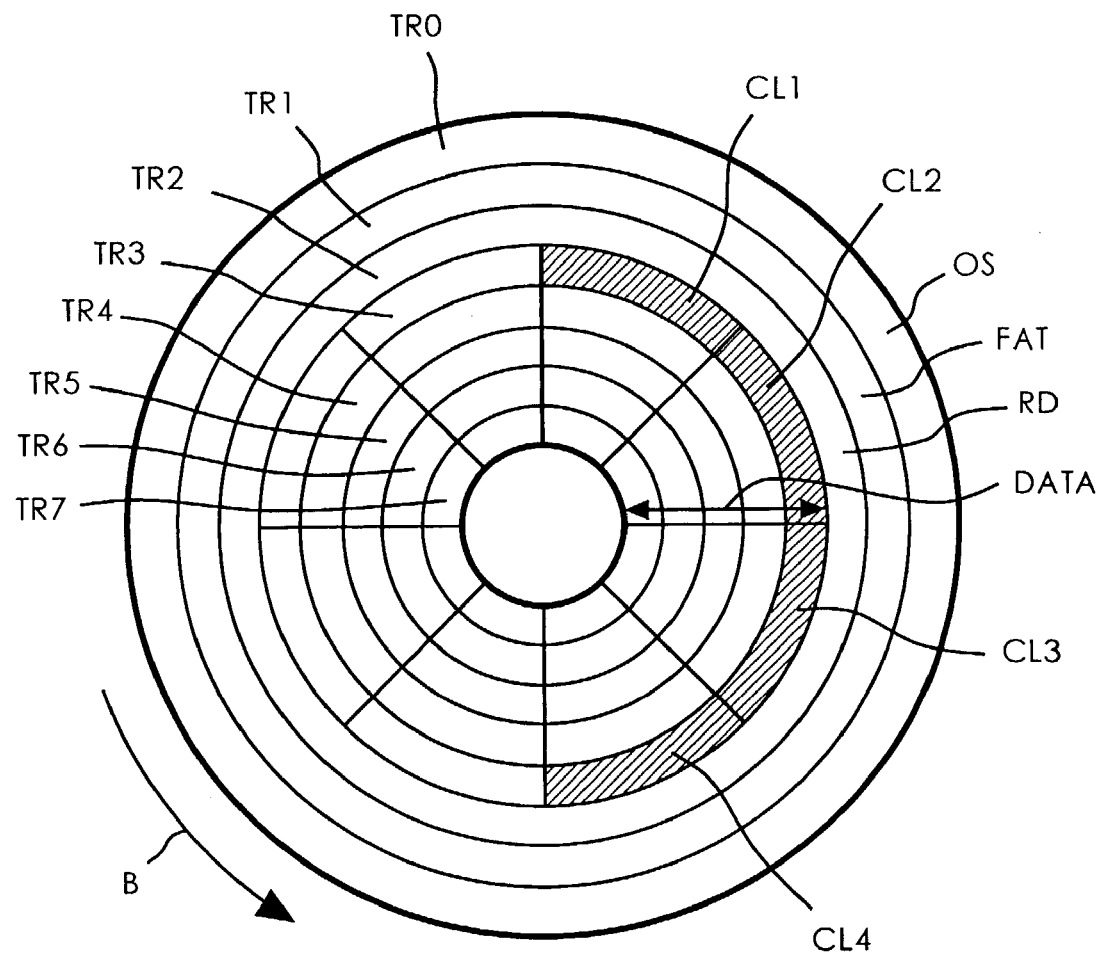
FIG. 4 is a diagram illustrating how to use the disk unit in a primary storage unit in FIG. 1.

FIG. 4 is a diagram illustrating how to use the disk unit 51 in the primary storage unit 42 in FIG. 1.

FIG. 4 illustrates a case where recording areas (clusters: CL1 to CL4) of the disk 90 are continuously used. Even in the conventional disk unit 21 shown in FIG. 12, information is recorded in a manner as shown in FIG. 4 at the initial stage of use. As the disk unit is further used, however, free recording areas become scattered, and the record information is discretely recorded (written) as shown in FIG. 12. In the disk unit 51 in the primary storage unit 42, on the other hand, the record information received from an external unit is successively recorded into consecutive recording areas on the same track at all times as shown in FIG. 4.

In the conventional disk, an OS of a MS-DOS® family records information onto the disk by utilizing a FAT or the like based on the write control information included in the received information. In this embodiment, however, the received information is successively or sequentially written into the track irrespective of the write control information. When the whole track has been written, the head is moved to a neighboring track with the minimum movement, and the writing is continued sequentially. The neighboring track is the one which is next on the inner peripheral side when the information is written starting from the track of the outer peripheral side, or is the one which is next on the outer peripheral side when the information is written starting from the track of the inner peripheral side.

In other words, when the information write request is received in the information recording system of this embodiment, the information is sequentially written in the consecutive storage areas (clusters) in the same storage track disregarding the write control information included in the received information and, when all recording areas in one track have been exhausted, the writing is continued to recording areas in a recording track adjacent to that track at the inside or outside, in the disk unit 51 of the primary storage unit 42.

In the above primary storage unit 42, the information is continuously written into the same track, and then written into the neighboring track, requiring the shortest seeking time for moving the head. Further, with the write control information being disregarded, the head moves the minimum number of times between a track where control information and management information are written and a track where actual record information is written. Namely, unlike the conventional hard disk unit, the seeking time for moving the head between the management information and the actual record information written into the disk or for moving the head to read the next record information written in a different track is reduced.

In contrast with the above primary storage unit 42, the secondary storage unit 43 in the information recording system of this embodiment is not different from that of the prior art. Namely, an OS of a MS-DOS® family records (writes) information into a disk by utilizing FAT or the like based on the write control information included in the received information among the information written into the primary storage unit 42. However, write processing of the secondary storage unit 43 is performed based on the write control information by reading the received information including the write control information from the primary storage unit 42 when the primary storage unit 42 is not performing processing in response to a write or read request. In other words, the information is transferred from the primary storage unit 42 to the secondary storage unit 43 and recorded therein by utilizing a free time when the primary storage unit 42 is not writing or reading information for the external unit. The control unit 41 performs processing for sequentially writing the received information into the primary storage unit 42 and for transferring to and recording in the secondary storage unit 43 the contents recorded in the primary storage unit 42.

The processing of the embodiment will be described next with reference to flowcharts of FIGS. 5 to 7.

Figure 5:
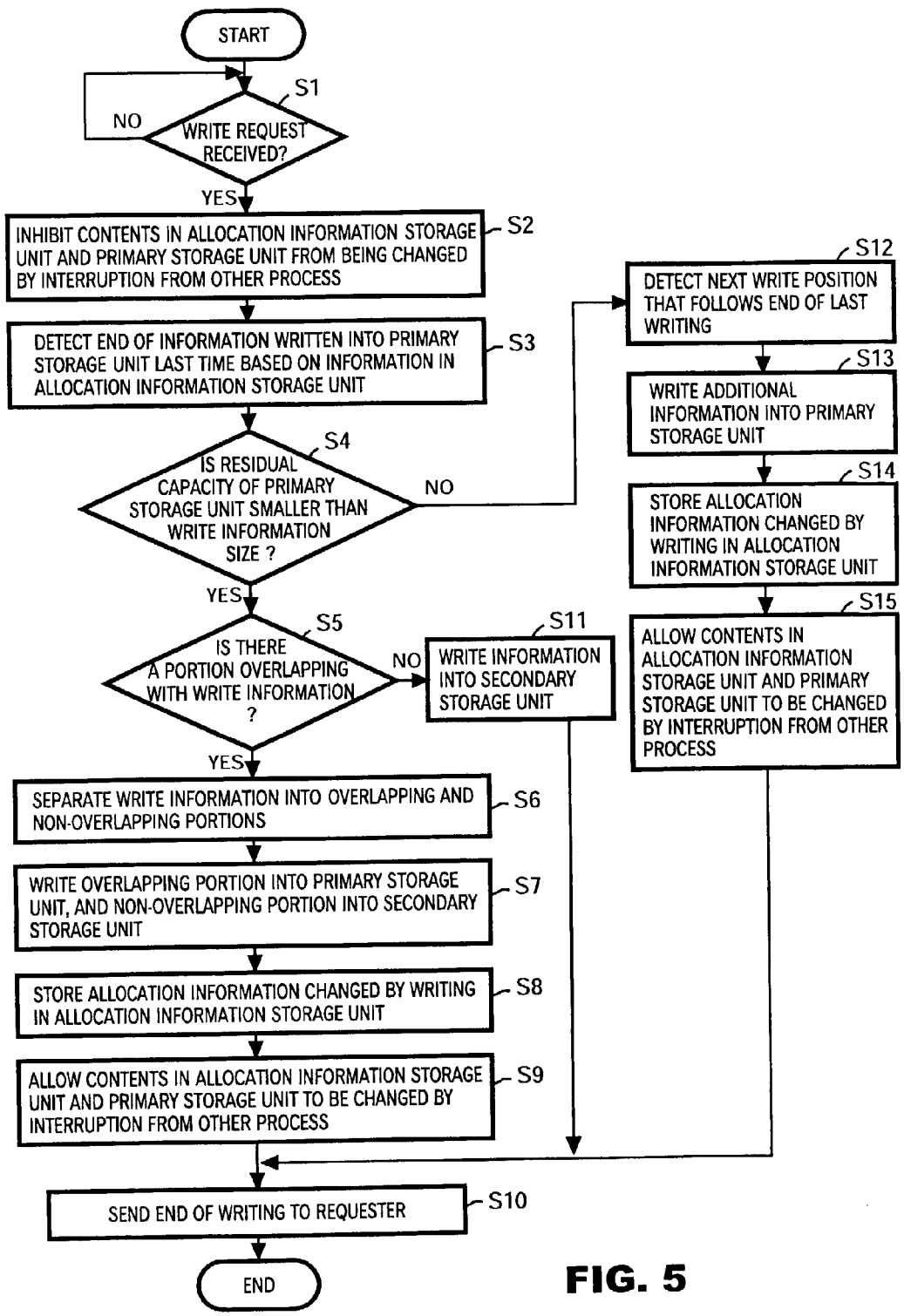
FIG. 5 is a flowchart for writing record information into the information recording system of the embodiment.

FIG. 5 is a flowchart for writing record information into the information recording system of this embodiment. First, the control unit 41 confirms whether an information write request is received (S1). If the write request is not received (S1: NO), step S1 is repeated again. If the write request is received (S1: YES), the contents stored in the primary storage unit 42 and in the allocation information storage unit 44 are inhibited (locked) from being changed by interruption from other processes (S2).

Next, an end position of write information stored in the primary storage unit 42 the last time is detected (S3) by referring to the allocation information storage unit 44 that stores the allocation information for each recording area of the primary storage unit 42. From this position information, it is confirmed whether residual capacity of the primary storage unit 42 is smaller than write information size (S4).

If the residual capacity of the primary storage unit 42 is smaller than the write information size (S4: YES), it is confirmed from the allocation information stored in the allocation information storage unit 44 whether the primary storage unit 42 has a portion overlapping the write information (S5). The write request is sent in a form to specify an allocated position in the secondary storage unit 43. As described above, the allocation information storage unit 44 stores the allocation information including both allocated positions in the primary storage unit 42 and original allocated positions in the secondary storage unit 43. By referring to the allocation information, therefore, it is possible to determine whether there is any information which has been written in the primary storage unit 42 but is not yet transferred to the secondary storage unit 43. If there is an overlapping portion (S5: YES), it means that there is a recording area in the primary storage unit 42, which can be overwritten. Based on the allocation information, therefore, the control unit 41 separates the write information into the overlapping portion and non-overlapping portion (S6), and writes the overlapping portion into the primary storage unit 42, and the non-overlapping portion into the secondary storage unit (S7).

Then, allocation information changed by the writing (S8) is stored in the allocation information storage unit 44, the contents stored in the primary storage unit 42 and the allocation information storage unit 44 are now allowed to be changed by the interruption from other processes (S9), and, finally, a notice indicating end of writing is sent to the requester of the writing (S10).

If the residual capacity of the primary storage unit 42 is not smaller than the write information size as judged from the allocation information (S4: NO), a next write position that follows the end position of the write information stored in the primary storage unit 42 the last time is detected from the position information (S12), and the write information is additionally written into available storage positions of the residual capacity in the primary storage unit 42 (S13).

The allocation information changed by the writing is stored in the allocation information storage unit 44 (S14), the contents stored in the primary storage unit 42 and the allocation information storage unit 44 are now allowed to be changed by the interruption from other processes (S15), and the end of writing is notified to the requester of the writing (S10).

If the primary storage unit 42 has no portion overlapping the write information as judged from the allocation information (S5: NO), no further information can be written into the primary storage unit 42 and, hence, the information is written into the secondary storage unit 43 (S11). When the writing is finished, the end of writing is notified to the requester of the writing (S10).

In the primary storage unit 42, as described above, the received information is sequentially written into a track irrespective of the write control information. When the whole track has been written, the writing is continued to a neighboring track with the minimum head movement, so that the information can be written into the disk unit 51 in the possible shortest time. In this embodiment, further, even after the information recording system is used for extended periods of time, the primary storage unit 42 can continue sequential writing. Therefore, it is always possible to write information into the disk unit 51 in the shortest possible time.

Figure 6:
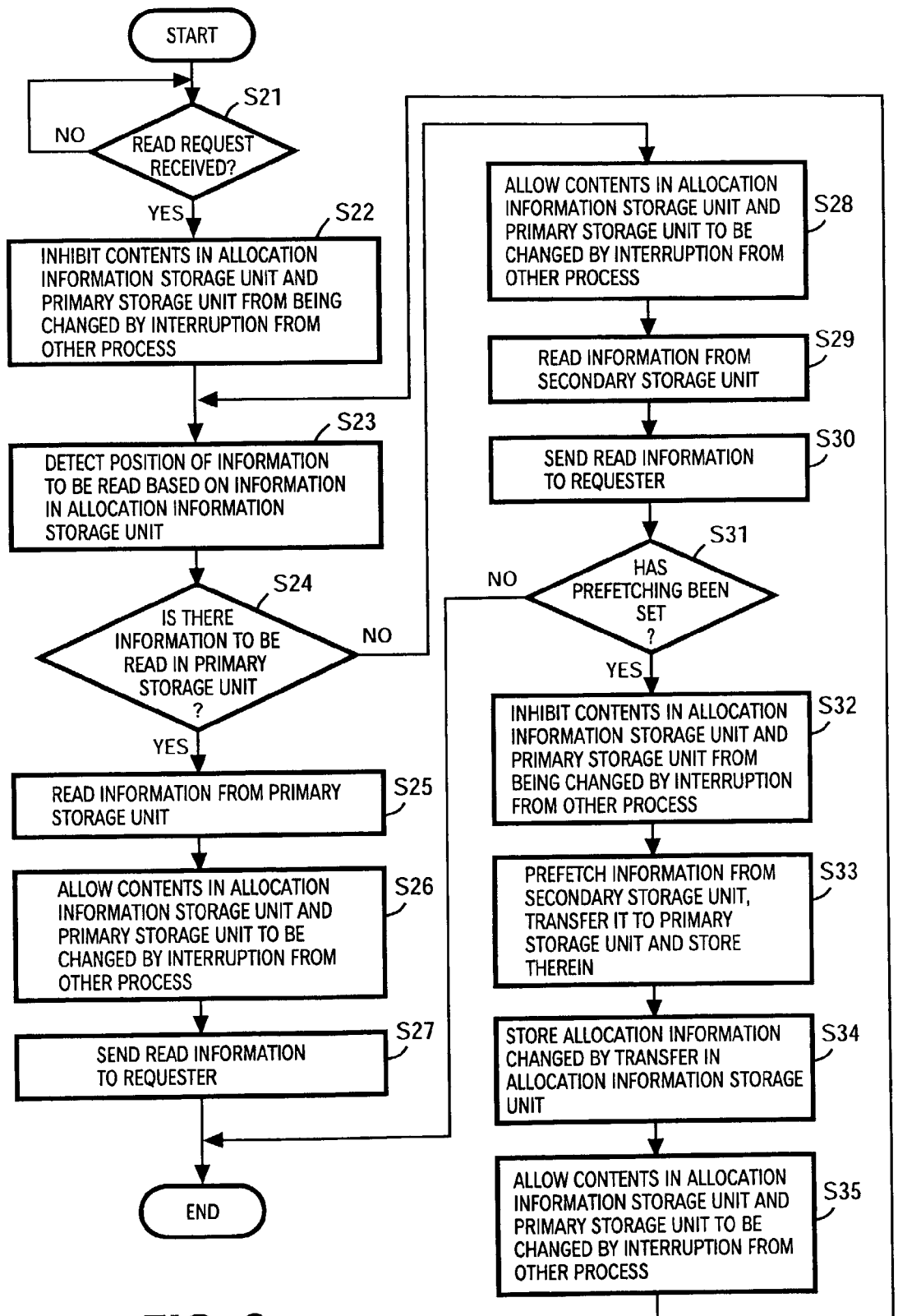
FIG. 6 is a flowchart for reading record information from the information recording system of the embodiment.

FIG. 6 is a flowchart for reading record information from the information recording system of this embodiment.

First, the control unit 41 confirms whether an information read request is received (S21). If the read request is not received (S21: NO), step S21 is repeated again. If the read request is received (S21: YES), the contents stored in the primary storage unit 42 and in the allocation information storage unit 44 are inhibited (locked) from being changed by the interruption from other processes (S22).

Next, allocation information of write information stored in the primary storage unit 42 is detected (S23) by referring to the allocation information storage unit 44 that stores the allocation information for each storage area of the primary storage unit 42. From this position information, it is confirmed whether the information to be read exists in the primary storage unit 42 (S24).

If the information to be read exists in the primary storage unit 42 as judged from the allocation information (S24: YES), the information requested by the received read request is read from the primary storage unit 42 (S25) based on the allocation information, the contents stored in the primary storage unit 42 and in the allocation information storage unit 44, locked at step S42, are now allowed to be changed by the interruption from other processes (S26), the read information is sent to the source of the read request (S27), and the process ends.

On the other hand, if there is no information in the primary storage unit 42 (S24: NO), the contents stored in the primary storage unit 42 and in the allocation information storage unit 44 and locked at step S22 are now allowed to be changed by the interruption from other processes (S28). Based on the allocation information, then, the information requested by the received read request is read from the write information stored in the secondary storage unit 43 (S29), and the read information is sent to the source of the read request (S30).

As described with reference to step S29, the information requested by the received read request is read from the write information stored in the secondary storage unit 43 based on the allocation information. This is done in the same manner as when the information is read from the conventional information recording system. Here, some conventional information recording systems can set prefetching.

Prefetching is a function to read an additional area which is physically or logically next to a storage area requested to be read, or other area expected to be read next based on some information or logic, when the requested storage area is read, and to store the information of the additional area in a cache memory or buffer memory in advance, so that this information can be read faster when a request to read this information is received.

If the prefetching has been set in this embodiment, the write information stored in the secondary storage unit 43 is transferred to and stored in the primary storage unit 42 in order to further shorten the read time.

At step S31, it is confirmed whether the prefetching function has been set. If it has been set (S31: YES), the contents stored in the primary storage unit 42 and in the allocation information storage unit 44 are inhibited (locked) from being changed by the interruption from other processes (S32), prefetched information read from the secondary storage unit 43 is additionally transferred to the primary storage unit 42 and stored (written) therein (S33). After the prefeched information has been written into the primary storage unit 42, allocation information for the prefetched information stored in the primary storage unit 42 is stored in the allocation information storage unit 44 (S34), the contents locked at step S32 and stored in the primary storage unit 42 and in the allocation information storage unit 44 are now allowed to be changed by the interruption from other processes (S35), and the routine returns to step S23 to detect the position of information to be read next.

Through the processing of steps S32 to S35, the information to be read next is now read from the primary storage unit 42 in which the sequential writing has been performed, which is faster than reading the information from the secondary storage unit 43.

On the other hand, if the prefetching function has not been set (S31: NO), no prefetched information is transferred to the primary storage unit 42, and the process ends.

Figure 7:
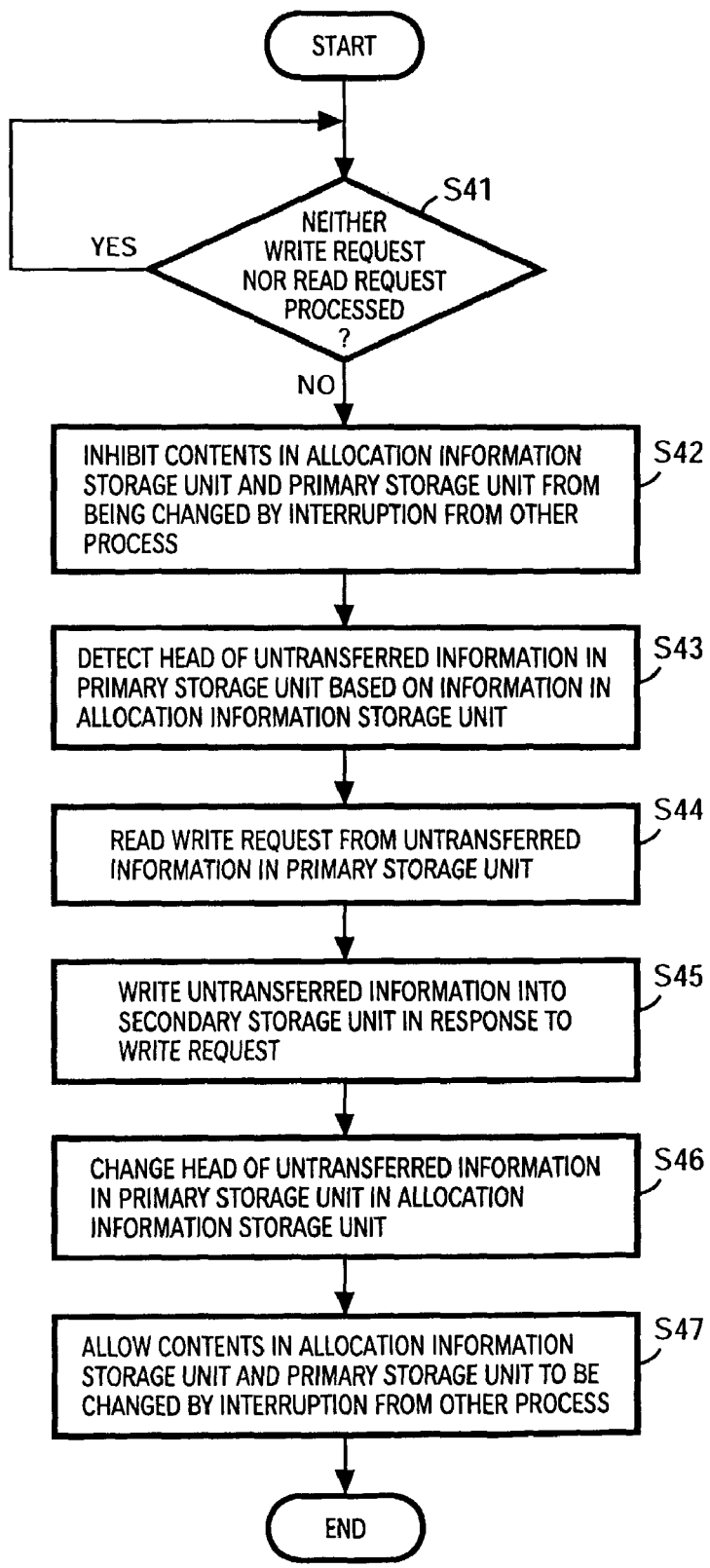
FIG. 7 is a flowchart for transferring record information from the primary storage unit to the secondary storage unit and storing the information therein in the information recording system of the embodiment.

FIG. 7 is a flowchart for transferring record information from the primary storage unit to the secondary storage unit and storing the information therein in the information recording system of this embodiment.

First, the control unit 41 confirms whether the information recording system 31 performs processing in response to an information write request or information read request (S41). If the information recording system 31 performs the processing in response to the write request or the read request (S41: YES), step S41 is repeated again. If the processing is not performed in response to the write request or the read request (S41: NO), the contents stored in the primary storage unit 42 and in the allocation information storage unit 44 are inhibited (locked) from being changed by the interruption from other processes (S42).

Next, the head of information that has not yet been transferred to the secondary storage unit 43 (hereinafter referred to as untransferred information) is detected from the allocation information for the write information stored in the primary storage unit 42 (S43) by referring to the allocation information storage unit 44 that stores the allocation information for each storage area of the primary storage unit 42. Based on the allocation information, the untransferred information is read from the primary storage unit 42 (S44).

As described above, the primary storage unit 42 sequentially stores the received information as it is, unlike the conventional disk unit in which information is recorded according to the write control information included in the received information. The untransferred information read from the primary storage unit 42 has, therefore, the same form as the received information, and includes the write control information therein.

The control unit 41 detects the write control information that was included in the original write request from the untransferred information read from the primary storage unit 42, and writes the untransferred information into the secondary storage unit 43 according to the write control information (S45).

After the untransferred information has been written into the secondary storage unit 43, allocation information of the information just stored in the secondary storage unit 43 and allocation information of the head of the untransferred information in the primary storage unit 42 are stored in the allocation information storage unit 44 (S46), and the contents locked at step S42 and stored in the primary storage unit 42 and in the allocation information storage unit 44 are now allowed to be changed by the interruption from other processes (S47).

In the information recording system of this embodiment, the write information is transferred from the primary storage unit 42 to the secondary storage unit 43 during a free time when no processing is performed in response to a write request or a read request. Even after the information recording system is used for extended periods of time, therefore, received information can be sequentially written into the primary storage unit 42.

In the information recording system of this embodiment which uses a plurality of disk units as described above, information is stored in two stages, i.e., in the primary storage unit 42 and in the secondary storage unit 43, enabling the information to be sequentially written into, or read from, the primary storage unit 42 even after it is used for extended periods of time. Therefore, even after the disk unit is used for extended periods of time, no extra seeking time is required.

Figure 8:
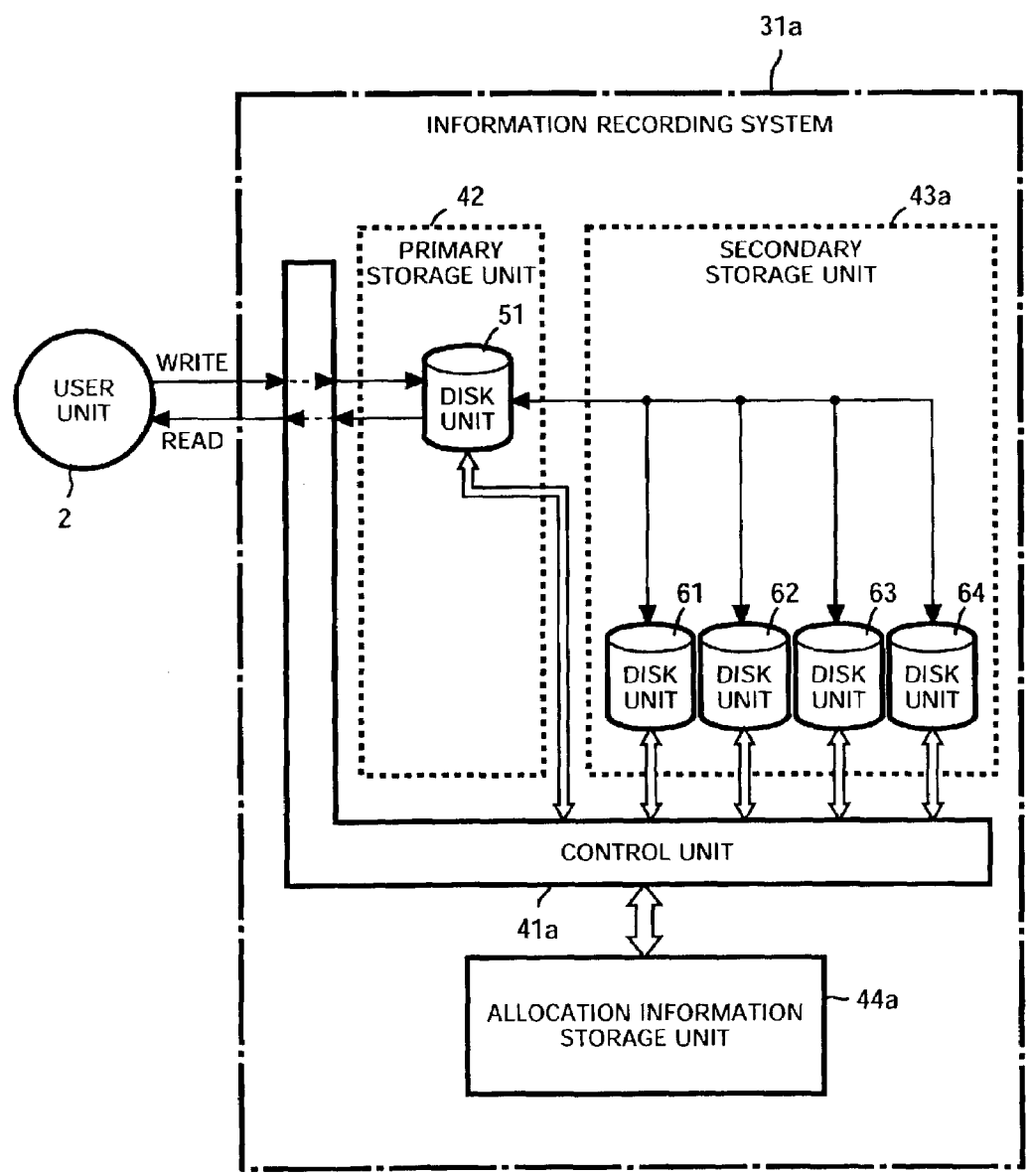
FIG. 8 is a block diagram illustrating the constitution of the multistage information recording system according to a second embodiment of the invention.

FIG. 8 is a block diagram illustrating the constitution of the multistage information recording system according to a second embodiment of the invention.

An information recording system 31a of the embodiment shown in FIG. 8 is different from the information recording system 31 of the first embodiment shown in FIG. 1 in that the number of disk units in a secondary storage unit 43a is increased in this embodiment, that is, four disk units 61 to 64 are used while only one disk unit 61 is used in the first embodiment, that allocation information stored in an allocation information storage unit 44a is changed due to the increase in the number of the disk units in the secondary storage unit 43a, and that a control unit 41a has a different control function due to the above changes. The rest is the same as that of the first embodiment.

As for the operation of this embodiment, since the secondary storage unit 43a assumes the conventional RAID configuration, step S14 in FIG. 7 in which the untransferred information is written from the primary storage unit 42 into the secondary storage unit 43 can be executed in a manner in which the information is written into the plural disk units simultaneously.

In the information recording system of this embodiment as described above, the secondary storage unit 43a is provided with a plurality of disk units to form a RAID configuration having shorter write and read times, so that it is possible to shorten the time for transferring the untransferred information from the primary storage unit 42 to the secondary storage unit 43a.

Figure 9:
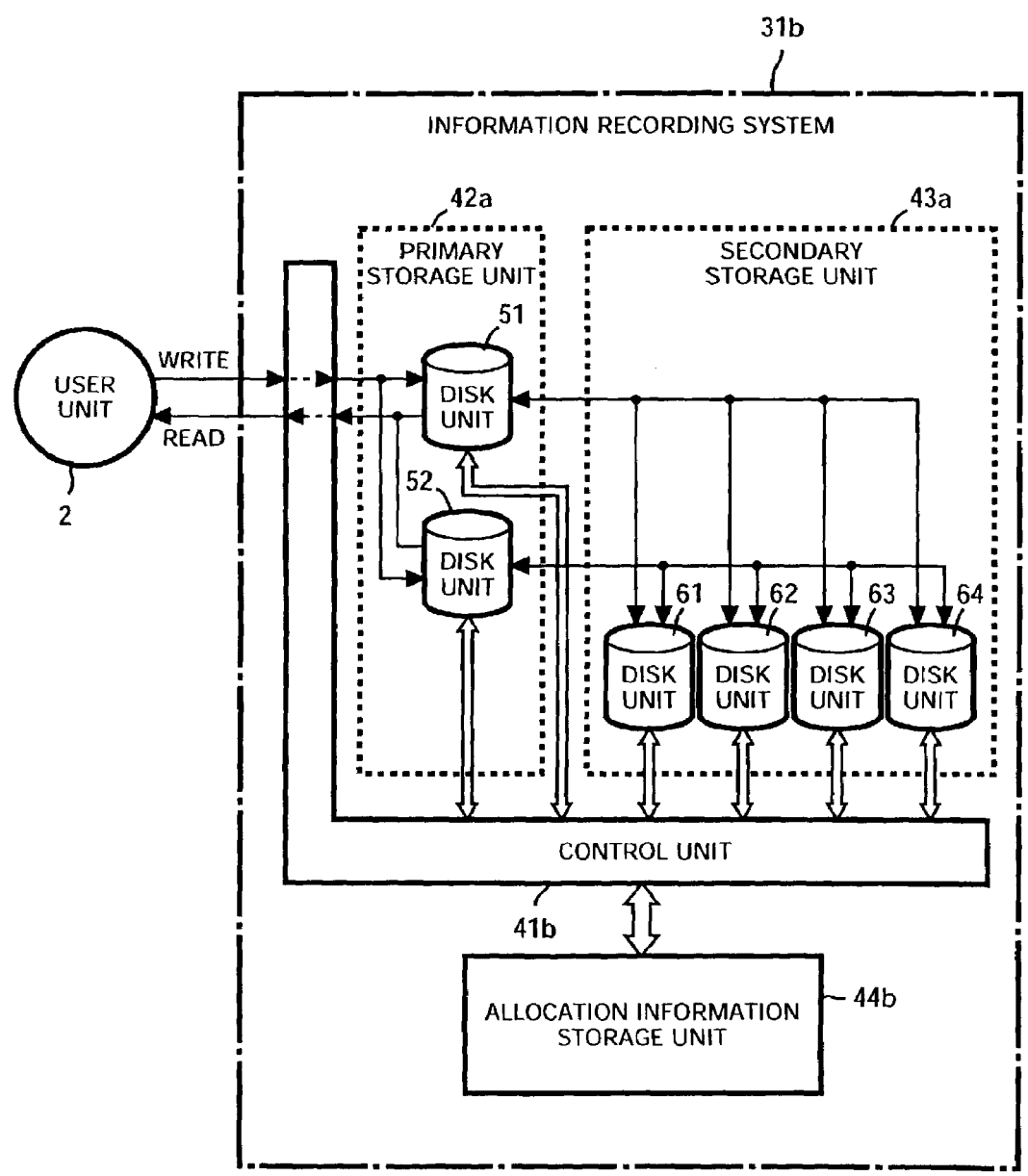
FIG. 9 is a block diagram illustrating the constitution of the multistage information recording system according to a third embodiment of the invention.

FIG. 9 is a block diagram illustrating the constitution of the multistage information recording system according to a third embodiment of the invention.

An information recording system 31b of the embodiment shown in FIG. 9 is different from the information recording system 31a of the second embodiment shown in FIG. 8 in that the number of disk units in a primary storage unit 42a is increased in this embodiment, that is, two disk units 51, 52 are used while only one disk unit 51 is used in the second embodiment, that allocation information stored in an allocation information storage unit 44b is changed due to the increase in the number of the disk units in the primary storage unit 42a, and that a control unit 41b has a different control function due to the above changes. The rest is the same as that of the second embodiment.

As for the operation of this embodiment, since the disk units of the primary storage unit 42a are arranged in parallel, it is possible to carry out the processing for writing the requested information into the primary storage unit 42 at steps S3 to S7 in FIG. 5 in parallel with the processing for reading the information at steps S25 and S31 in FIG. 6.

In the information recording system of this embodiment as described above, the primary storage unit 42*a* is provided with a plurality of disk units in parallel to successively use the disk units in rotation, making it possible to shorten the time for writing or reading the information, to write and read the information in large quantities and, further, to shorten the time for reading the prefetched information by once transferring the prefetched information to the primary storage unit 42*a* when the information is to be prefetched from the secondary storage unit 43*a*.

Described next is recovery in the case where the power source voltage is interrupted or drops suddenly due to an abnormal condition in a power-transmission system, or the power source voltage is interrupted or drops instantaneously due to a parallel connection of a power source system with other devices, in which each of the allocation information storage units 44 to 44*b* in the above embodiments is constituted of volatile semiconductor elements.

Figure 10:
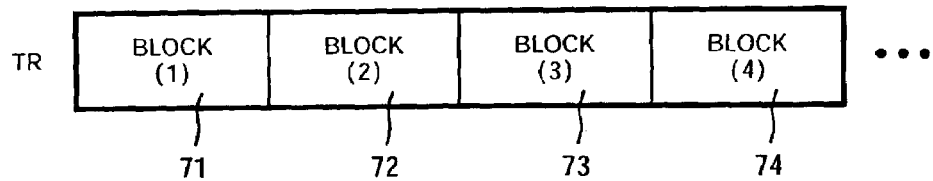
FIG. 10 is a diagram illustrating the contents of each track shown in FIG. 3 or 4.
Figure 10:
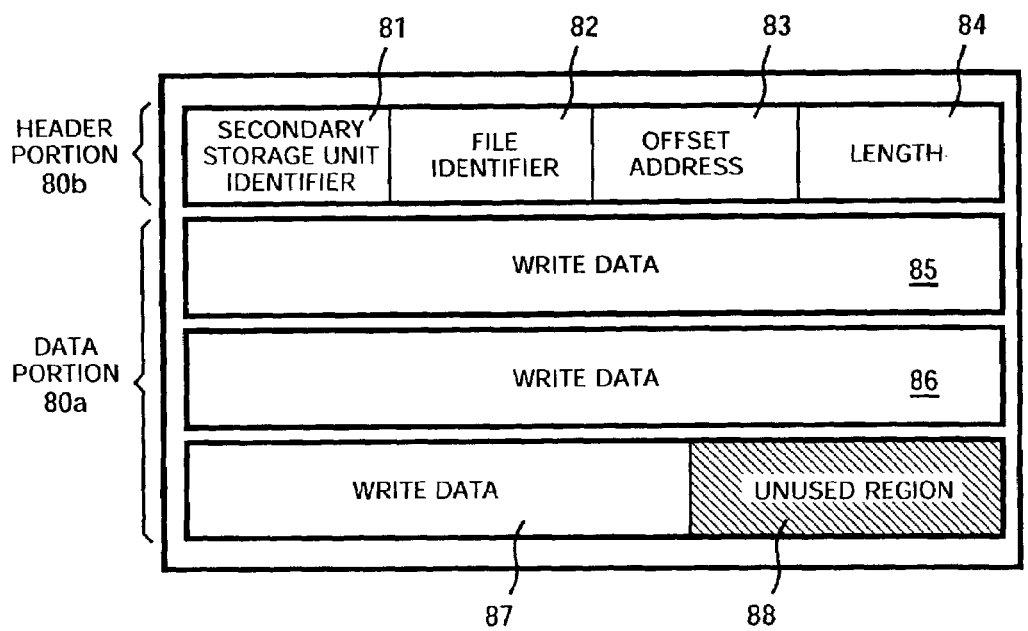

FIG. 10 is a diagram illustrating the contents of each track shown in FIG. 3 or 4.

In the track shown in FIG. 10(A), for example, sectors (SC0 to SC3, etc.) as shown in FIG. 3 or clusters (CL1 to CL4, etc.) constituted of a predetermined number of sectors as shown in FIG. 4 are shown as blocks 71 to 74 of a fixed size.

FIG. 10(B) illustrates in detail the contents of each block shown in FIG. 10(A). A header portion 80 includes a secondary storage unit identifier 81 representing information for distinguishing the secondary storage unit 43 from the primary storage unit 42, a file identifier 82 for identifying each file in the secondary storage units 43, an offset address 83 representing offset address information of each file, and a length information 84 representing a data length of each file. A data portion 80*a* includes write data 85 to 87 to be written or read by using the information in the header portion 80, and an unused region 88.

In the case of the first embodiment of FIG. 1, for example, if the contents stored in the allocation information storage unit 44 constituted of volatile semiconductor elements are lost due to an instantaneous drop of the power source voltage, the embodiment could no longer perform proper operations.

In the case of the first embodiment, therefore, when the power source voltage has restored, the control unit 41 first reads from the first storage unit 42 the header information in the header portion 80 in the storage block arranged in a fixed size shown in FIG. 10(A). By using the header information, the control units 42 restores at least a portion of the contents stored in the allocation information storage unit 44.

Here, the storage blocks in the primary storage unit 42 are arranged in a fixed size as shown in FIG. 10(A), and the header information includes information as shown in the header portion 80 of FIG. 10(B) necessary for storing write information in the secondary storage unit. Further, for example, the control unit 41 of FIG. 1 has a program for determining, upon restoring the power source voltage, whether the contents stored in the allocation information storage unit 44 constituted of the volatile semiconductor elements have been lost, and performing the restoration processing if the contents have been lost.

At least a portion of the contents can be restored because even though the contents stored in the allocation information storage unit 44 could be restored based upon the information stored in the header portion in the primary storage unit 42, allocation information newly added at the time of transferring information from the primary storage unit 42 to the secondary storage unit 43 during the normal operation cannot be restored.

Also, in the second and third embodiments, the contents stored in the allocation information storage units 44*a* and 44*b* can similarly be restored based upon the information stored in the header portion in the primary storage units 42 and 42*a* by using the control units 41*a* and 41*b*.

Thus, according to this invention in which the allocation information storage unit is constituted of, for example, volatile semiconductor elements, the contents stored in the allocation information storage unit can be restored even when they are lost due to a sudden drop or interruption of the power source voltage caused by an accident or the like, so that the allocation information storage unit can be realized with reduced cost by using inexpensive volatile semiconductor elements. In this case, the content stored in the allocation information storage unit can be restored even when the power source voltage has suddenly dropped.

[Advantages of the Invention]

In the information recording system of the invention which uses a plurality of disk units as described above, information is stored in two stages, i.e., in the primary storage unit and in the secondary storage unit, and is sequentially written into or read from the primary storage unit even after it is used for extended periods of time, so that no extra seeking time is required even after the disk unit is used for extended periods of time.

In the information recording system of the invention, further, the received information is sequentially written into a track in the primary storage unit irrespective of the write control information. When the whole track has been written with the information, the sequential writing is continued to a neighboring track with the minimum head movement. Therefore, the information can be written into the disk unit in the shortest possible time.

In the information recording system of the invention, further, even after the information recording system is used for extended periods of time, the primary storage unit continues to sequentially write the information. Therefore, the information can always be written into the disk unit in the shortest possible time, which is not limited to the initial stage of use.

In the information recording system of the invention having the prefetching function, further, the prefetched information can be read from the primary storage unit in which it has been sequentially written even when information is to be read from the secondary storage unit. Therefore, faster reading can be achieved as compared with the case where the whole information is read from the secondary storage unit.

In the information recording system of this invention, further, the write information is transferred from the primary storage unit to the secondary storage unit during a free time when no processing is performed in response to a write or read request. Therefore, even after the information recording system is used for extended periods of time, the received information can be sequentially written into the primary storage unit.

In the information recording system of the invention having a plurality of disk units in the secondary storage unit, further, the disk units are successively used in rotation in the RAID configuration having shorter write and read times, so that it is possible to shorten the time for transferring the untransferred information from the primary storage unit 42 to the secondary storage unit 43a.

In the information recording system of the invention having a plurality of disk units in the primary storage unit, further, the disk units are successively used in rotation in a parallel configuration, making it possible to shorten the time required for writing or reading the information so that a large amount of information can be written or read, and, further, making it possible to shorten the time required for reading the prefetched information by once transferring the information prefetched from the secondary storage unit to the primary storage unit.

According to this invention in which the allocation information storage unit is constituted of volatile semiconductor elements and the control unit has a program for performing the restoration processing to restore the power source voltage, the contents stored in the allocation information storage unit can be restored even when they are lost due to a sudden drop or interruption of the power source voltage caused by an accident or the like. The allocation information storage unit can be realized with reduced cost by using inexpensive volatile semiconductor elements.

What is claimed is:

1. An information recording system, comprising:
   a primary storage unit;
   a secondary storage unit; and
   a control unit coupled to the primary storage unit and the secondary storage unit, wherein the control unit is configured to perform operations for recording information, the operations comprising:
      receiving a write request and information including record information and write control information;
      detecting a next write position in the primary storage unit, wherein the next write position successively follows the end of previously stored record information and write control information stored in the primary storage unit responsive to a most recent previous write request;
      writing the received record information and write control information, starting at the next write position, sequentially in consecutive recording areas on a first track on the primary storage unit;
      writing the received record information and write control information sequentially in consecutive recording areas on a second track adjacent the first track, if all of the received record information and write control information has not been written in the first track and there are no more recording areas on the first track that are available to be written to;
      reading the received record information and write control information from the primary storage unit; and
      writing the received record information and write control information in the secondary storage unit in accordance with the received write control information, wherein the operation of writing the received record information and write control information in the secondary storage unit is performed only when no read or write requests are being processed by the primary storage unit.

2. An information recording system, comprising:
   a primary storage unit;
   a secondary storage unit; and
   a control unit coupled to the primary storage unit and the secondary storage unit, wherein the control unit is configured to perform operations for recording information, the operations comprising:
      receiving a write request and information including record information and control information;
      detecting a next write position in the primary storage unit;
      writing the received information, starting at the next write position, sequentially in consecutive recording areas on a first track on the primary storage unit;
      writing the received information sequentially in consecutive recording areas on a second track adjacent the first track, if all of the received information has not been written in the first track and there are no more recording areas on the first track that are available to be written to;
      reading the received information from the primary storage unit; and
      writing the received information in the secondary storage unit in accordance with the control information; and
   wherein the control information is disregarded when performing the operation of writing the received information, starting at the next write position, sequentially in consecutive recording areas on the first track on the primary storage unit, and when performing the operation of writing the received information sequentially in consecutive recording areas on the second track.

3. An information recording system, comprising:
   a primary storage unit;
   a secondary storage unit;
   an allocation information storage unit; and
   a control unit coupled to the primary storage unit, the secondary storage unit, and the allocation information storage unit, wherein the control unit is configured to perform operations for writing information, the operations comprising:
      receiving a write request and information including record information and control information;
      detecting an end position of the record information most recently stored in the primary storage unit; and
      determining whether the residual capacity of the primary storage unit is smaller than the size of the received information;
      and, if not:
         detecting a next write position on the primary storage unit;
         writing the received information, starting at the next write position, sequentially in consecutive recording areas on a first track on the primary storage unit;
         writing the received information sequentially in consecutive recording areas on a second track adjacent the first track, if all of the received information has not been written in the first track and there are no more recording areas on the first track that are available to be written to;
         storing changed allocation information in the allocation information storage unit; and
         sending an end of writing notice.

4. The information recording system of claim 3, wherein the operations further comprise:
   responsive to receiving the write request, locking the contents of the primary storage unit and the allocation information storage unit to prevent the contents of the primary storage unit and the allocation information storage unit from being changed by processes other than processes associated with the write request; and
   after the operation of storing changed allocation information, unlocking the contents of the primary storage unit and the allocation information storage unit to permit the contents of the primary storage unit and the allocation information storage unit to be changed by processes in addition to processes associated with the write request.

5. The information recording system of claim 3, wherein the operation of detecting an end position of the received information most recently stored in the primary storage unit comprises referring to allocation information stored in the allocation information storage unit.

6. The information recording system of claim 3, wherein the operation of storing changed allocation information in the allocation information storage unit comprises storing information identifying the end position of the received information most recently stored in the primary storage unit.

7. The information recording system of claim 3, wherein the operations further comprise the following operations if the residual capacity of the primary storage unit is smaller than the size of the received information:
   determining whether the primary storage unit has a portion overlapping the received information;
   and, if not:
      writing the received information in the secondary storage unit; and
      sending an end of writing notice;
   and, if so:
      separating the received information into an overlapping portion and a non-overlapping portion;
      writing the overlapping portion in the primary storage unit;
      writing the non-overlapping portion in the secondary storage unit;
      storing changed allocation information in the allocation information storage unit; and
      sending an end of writing notice.

8. The information recording system of claim 3, wherein the operations further comprise:
   confirming that a write request is not being processed;
   confirming that a read request is not being processed;
   responsive to confirming that a write request is not being processed and that a read request is not being processed, locking the contents of the primary storage unit and the allocation information storage unit to prevent the contents of the primary storage unit and the allocation information storage unit from being changed by processes other than processes associated with transferring information from the primary storage unit to the secondary storage unit;
   detecting the head of received information in the primary storage unit that has not been transferred to the secondary storage unit;
   reading the not-transferred received information from the primary storage unit;
   writing the not-transferred received information in the secondary storage unit in accordance with the control information in the untransferred received information;
   storing changed allocation information in the allocation information storage unit; and
   unlocking the contents of the primary storage unit and the allocation information storage unit to permit the contents of the primary storage unit and the allocation information storage unit to be changed by processes in addition to processes associated with transferring information from the primary storage unit to the secondary storage unit.

9. An information recording system, comprising:
   a primary storage unit;
   a secondary storage unit;
   an allocation information storage unit; and
   a control unit coupled to the primary storage unit, the secondary storage unit, and the allocation information storage unit, wherein the control unit is configured to perform operations for reading information, the operations comprising:
   receiving a read request;
   responsive to receiving the read request, locking the contents of the primary storage unit and the allocation information storage unit to prevent the contents of the primary storage unit and the allocation information storage unit from being changed by processes other than processes associated with the read request; and
   determining whether record information to be read is in the primary storage unit;
      and, if so:
         reading the record information from the primary storage unit;
         unlocking the contents of the primary storage unit and the allocation information storage unit to permit the contents of the primary storage unit and the allocation information storage unit to be changed by processes in addition to processes associated with the read request; and
         sending the record information to a source of the read request
      and, if not:
         unlocking the contents of the primary storage unit and the allocation information storage unit to permit the contents of the primary storage unit and the allocation information storage unit to be changed by processes in addition to processes associated with the read request;
         reading the record information from the secondary storage unit; and
         sending the record information to the source of the read request.

10. The information recording system of claim 9, wherein the read request includes read control information, and wherein the operations further comprise disregarding the read control information if the record information is in the primary storage unit.

11. The information recording system of claim 9, wherein the operation of determining whether the record information is in the primary storage unit comprises detecting allocation information for the record information from the allocation information storage unit.

12. The information recording system of claim 9, wherein the operations further comprise:
   ascertaining whether a prefetching function has been set;
   and, if so:
      locking the contents of the primary storage unit and the allocation information storage unit to prevent the contents of the primary storage unit and the allocation information storage unit from being changed by processes other than processes associated with the prefetching function;
      reading prefetch information from the secondary storage unit;
      storing the prefetch information in the primary storage unit;
      storing changed allocation information in the allocation information storage unit; and
      unlocking the contents of the primary storage unit and the allocation information storage unit to permit the contents of the primary storage unit and the allocation information storage unit to be changed by processes in addition to processes associated with the prefetching function.

13. The information recording system of claim 12, wherein the operations further comprise detecting allocation information for the record information, and reading the prefetch information from the primary storage unit if the prefetch information is the record information.

14. The information recording system of claim 9, wherein the operations further comprise:
reading header information from storage blocks in the primary storage unit; and
using the header information to restore at least part of the contents of the allocation information storage unit after a power source voltage drop.

15. An information recording system, comprising:
means for receiving a write request and information including record information and control information;
means for detecting a next write position in a primary storage unit;
means for writing the received information, starting at the next write position, sequentially in consecutive recording areas on a first track on the primary storage unit;
means for writing the received information sequentially in consecutive recording areas on a second track adjacent the first track, if all of the received information has not been written in the first track and there are no more recording areas on the first track that are available to be written to;
means for reading the received information from the primary storage unit; and
means for writing the received information in a secondary storage unit in accordance with the control information.

16. An information recording system, comprising:
a primary storage unit;
a secondary storage unit; and
a control unit coupled to the primary storage unit and the secondary storage unit, wherein the control unit is configured to perform operations for recording information, the operations comprising:
receiving a write request and information including record information and write control information;
detecting a next write position in the primary storage unit, wherein the next write position successively follows the end of previously stored record information and write control information stored in the primary storage unit responsive to a most recent previous write request;
writing the received record information and write control information, starting at the next write position, sequentially in consecutive recording areas on a first track on the primary storage unit;
writing the received record information and write control information sequentially in consecutive recording areas on a second track adjacent the first track, if all of the received record information and write control information has not been written in the first track and there are no more recording areas on the first track that are available to be written to;
reading the received record information and write control information from the primary storage unit; and
writing the received record information and write control information in the secondary storage unit in accordance with the received write control information; and
wherein the control unit is further configured to perform operations for reading information, and wherein the operations further comprise:
receiving a read request;
determining whether information requested in the read request is in the primary storage unit;
and, if so:
reading the information requested in the read request from the primary storage unit;
and, if not:
reading the information requested in the read request from the secondary storage unit.

17. A method for storing information, the method comprising the following operations:
receiving a write request and information;
detecting a next write position in a primary storage unit;
writing the received information, starting at the next write position, sequentially in consecutive recording areas on a first track on the primary storage unit;
writing the received information sequentially in consecutive recording areas on a second track adjacent the first track, if all of the received information has not been written in the first track and there are no more recording areas on the first track that are available to be written to;
reading the received information from the primary storage unit; and
writing the received information in a secondary storage unit in accordance with control information included with the received information;
receiving a read request to retrieve record information; and
determining whether the record information is in the primary storage unit;
and, if so:
reading the record information from the primary storage unit; and
sending the record information to a source of the read request
and, if not:
reading the record information from the secondary storage unit; and
sending the record information to the source of the read request.

18. The method of claim 17, wherein the operation of determining whether the record information is in the primary storage unit comprises detecting allocation information for the record information from an allocation information storage unit.

* * * * *